United States Patent [19]

Samis

[11] 4,406,567
[45] Sep. 27, 1983

[54] APPARATUS FOR ENGRAVING INDICIA ON SMALL OBJECTS

[76] Inventor: Philip L. Samis, 1 Place Ville Marie, Ste. 1521, Montreal, Quebec, Canada, H3B 2B5

[21] Appl. No.: 189,022

[22] Filed: Sep. 22, 1980

[51] Int. Cl.³ .................. B23Q 35/10; B43L 13/10
[52] U.S. Cl. .................................. 409/92; 33/24 B; 409/90; 409/91
[58] Field of Search ............... 409/89, 90, 91, 92, 409/86, 134; 33/24 R, 24 B, 24 C

[56] References Cited

U.S. PATENT DOCUMENTS

| | | | |
|---|---|---|---|
| 190,797 | 5/1877 | Ware | 33/24 B |
| 517,680 | 4/1894 | Chase | 409/92 |
| 1,148,397 | 7/1915 | Nelson | 409/134 X |
| 1,621,317 | 3/1927 | Eaton | 409/92 |
| 1,923,208 | 8/1933 | Howey | 409/92 |
| 2,562,269 | 7/1951 | Gruettner et al. | 33/24 B |
| 4,166,319 | 9/1979 | Rosenberg | 409/92 X |
| 4,317,287 | 3/1982 | Sausale | 33/24 R |

*Primary Examiner*—Z. R. Bilinsky
*Attorney, Agent, or Firm*—Austin R. Miller

[57] ABSTRACT

Apparatus for engraving has a work piece support adjacent to scribing means for engraving inidicia on the work piece. A stylus moves a pivotal support to which scribing means is attached. Front-writing is achieved by positioning the scribing means above the stylus but below the pivot of the pivotal support. Scribing means concurrently engrave a plurality of work pieces from a single stylus. The work piece support is movable up and down, towards and away from the scribing means. The distance between the pivotal support and the stylus is adjustable. Vibratory means connected to the pivotal support vibrate the scribing means when the scribing means contacts the work piece. Identification means for dentures is provided.

23 Claims, 9 Drawing Figures

4,406,567

APPARATUS FOR ENGRAVING INDICIA ON SMALL OBJECTS

BACKGROUND OF THE INVENTION

1. Field of the Invention

This invention relates to engraving very small indicia on small work objects which are then securely and retrievably stored in a living body for subsequent and even postmortem identification. The invention also relates to denture identification.

2. Description of the Prior Art

Miniaturized chips which can be engraved using apparatus of this invention ar disclosed in U.S. Pat. No. 4,027,391.

SUMMARY OF THE INVENTION

This invention provides apparatus for high quality, front-writing engraving, i.e. wherein the direction of scribing on the work object is the same as the direction of movement of the stylus guided by the engraver, capable of concurrently scribing a plurality of engraved images in response to movement of a single stylus. The engraving apparatus has a work piece provided with a support which may be automatically engaged with and disengaged from scribing means, in response to engagement and disengagement of the stylus with and from the pattern it is following.

The degree of miniaturization (de-magnification or compression) of the engraved image, as compared to the original pattern, can be varied.

The invention provides means for enhancing and facilitating the creation of the microimpression upon the work piece by applying vibrations thereto. The invention also allows the engraver, after interruption, to resume engraving at a known point.

This invention also provides means for identifying dentures.

The drawings depict embodiments selected for illustration and are not intended to limit the scope of the invention as defined in the appended claims.

DESCRIPTION OF THE PREFERRED EMBODIMENTS

Figure 1:
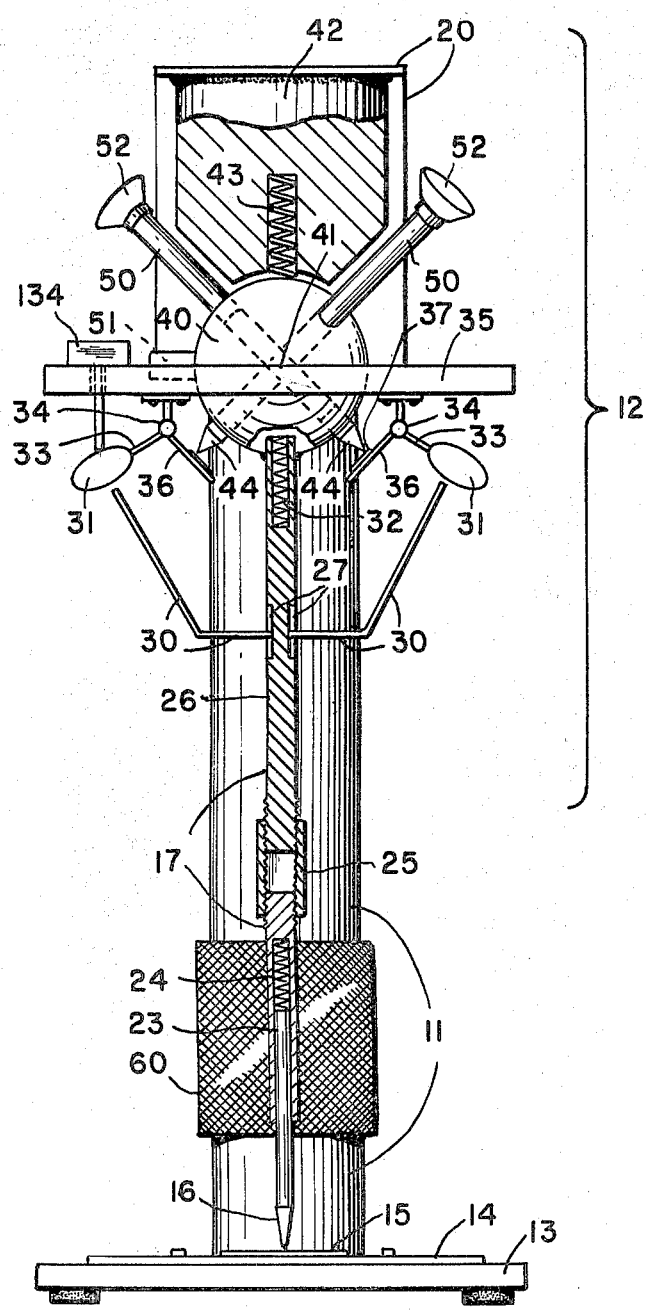
FIG. 1 is a front view, partially broken away and partially in section, of apparatus embodying an aspect of the invention.
Figure 2:
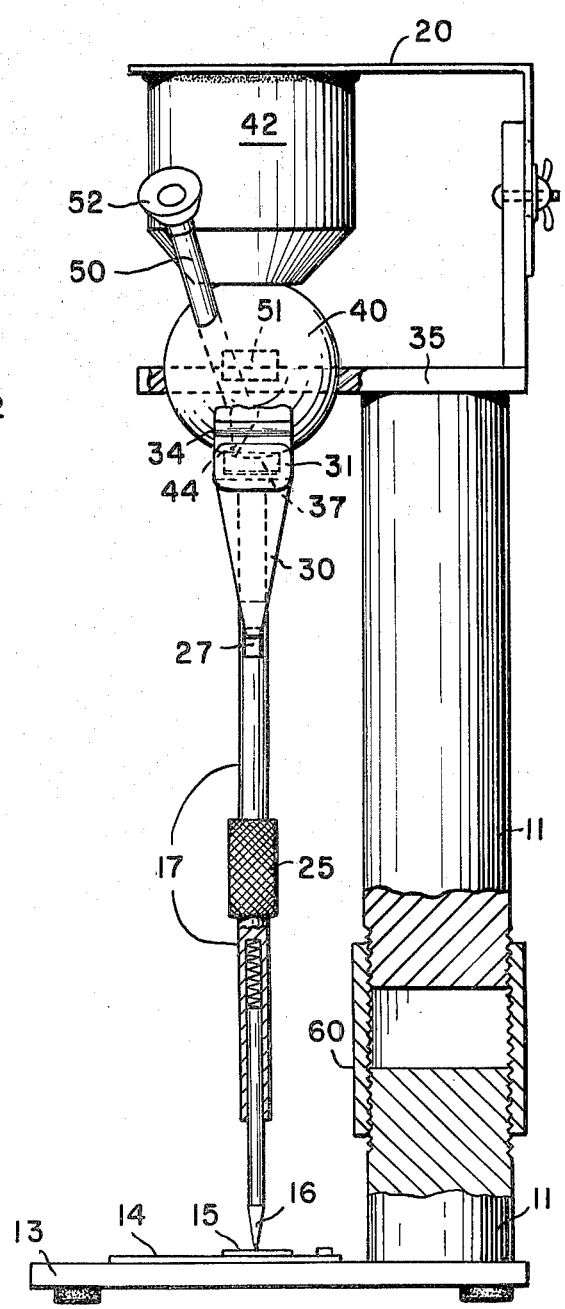
FIG. 2 is a side view, partially broken away and partially in section, of apparatus shown in FIG. 1.

In FIGS. 1 and 2 the engraving apparatus includes a column base 13, a column 11 extending upwardly therefrom, and an upper portion 12 supported by column 11. Fixed on base 13 is a mounting plate 14 which carries a template 15 facing thereagainst, in which indicia of a predetermined character have previously been inscribed. The indicia are desirably channeled into the template 15, with the channels corresponding to but being much larger than the desired engraved indicia. A stylus 16 may extend into the channels. The stylus 16 is carried at the lower end of a sleeve member designated generally 17 which extends upwardly into upper portion 12.

Stylus 16 is slidably mounted within a sleeve lower portion 23 and is spring urged in a downward direction by a spring 24 contained within sleeve lower portion 23. Sleeve lower portion 23 forms the lower end of sleeve member 17. The upper end of sleeve lower portion 23 threadably engages an internally threaded adjuster sleeve 25 which threadably engages upper leg 26 which may be considered as an additional part of sleeve 17. This allows the overall length of sleeve member 17 to be adjusted. Upper leg 26 is slotted at 27 to accommodate side arms 30 which extend outwardly from the upper leg 26 to each side thereof. Side arms 30 are angled upwardly and terminate just beneath counterweights 31. Side arms 30 can slide upwardly and downwardly within slots 27 and are movable the vertical length of slots 27 independently of movement of sleeve member 17.

The upper end of leg portion 26 is slidably received by an unnumbered receptacle in sphere 40.

Upper leg portion 26 is internally bored at its upper end to receive compression spring 32, which acts against a sphere 40 and continuously urges sleeve member 17 downwardly.

Extending laterally from column 11 is a support plate 35 to which bearings 34 are secured.

Cranks 100 are mounted at their central portions by journaling in bearings 34; respective arms of said cranks are denoted 33 and 36.

Each counterweight 31 is supported by and rigidly connected to one arm 33 of crank 100. The remaining arm of crank 100 is a carrier arm 36 the end of which is adapted to securely hold and carry the work piece 37. Note that two crank-counterweight-work piece assemblies are provided. Each work piece 37 and carrying crank assembly is arranged to be swung pivotally upwardly independently of the other remaining work piece and crank assembly in response to the downward pull of gravity on the associated counterweight 31. Note that the work pieces are shown greatly enlarged to aid in understanding the invention.

When stylus 16 is moved upwardly arms 30 contact the lower extremeties of their respective slots 27 and contact and lift their respective counterweights 31 rotating cranks 100 about their respective bearings 34, causing work pieces 37 to swing downwardly and outwardly away from their respective associated scribes 44. Note that arms 30 can be raised independently of sleeve member 17, within slots 27, to contact counterweights 31 and disengage work pieces 37 from their respective engraving points without removing stylus 16 from a channel in template 15.

Mounted on lateral support plate 35, which extends laterally from and is rigidly connected to an upper portion of column 11, is a pivotal support in the form of a sphere 40 pivotally mounted in a manner to rotate freely in any direction about its center 41. Sphere 40 resides in and is supported by a spherically tapered opening in plate 35. The opening has not been numbered in the drawings. Spring 32 within tube 17 extends against the lower portion of rotatable pivotable support sphere 40. Similarly, a pressure pad block 42 having a spherical lower surface is urged downwardly upon the upper portion of sphere 40 by spring 43. Because of the forces exerted by springs 32 and 42 and the spherically curved shapes of the aperture in lateral plate 35 and of the pad 42 where these members contact sphere 40, sphere 40 is held in position against lateral and vertical movement but is free to rotate about its center 41.

Mounted in and extending from the lower portion of sphere 40, below center 41 of the sphere, are scribes 44. The scribes extend downwardly and outwardly at about a forty-five degree angle and have sharp points to contact corresponding respective work pieces 37 when the respective counterweights 31 are in their lower positions as shown in the drawings. Since cranks 100 in which counterweights 31 are mounted are movable independently of one anther, one scribe 44 may contact its respective work piece 37 while remaining scribe 44 is not engaged with its respective work piece.

When stylus 16 is moved within a channel of template 15, a corresponding but much smaller motion is transferred to scribe 44, whereupon each scribe 44 inscribes indicia on the respective work pieces 37 corresponding to indicia on template 15. Since scribes 44 are below center 41 of sphere 40, a forward-writing effect is achieved, i.e. the motion of scribes 44 is the same as that of stylus 16.

Note that the plane defined by a scribe point as it contacts work piece 37 is skew to the plane, defined by template 15, in which stylus 16 moves. The plane in which stylus 16 moves in two dimensional and flat. The plane defined by the scribe point is also two dimensional, but rather than being flat, is spherically curved due to the rotational motion of sphere 40 about the sphere center. The counterweights acting about bearings 34 continuously urge work piece 37 against the scribe 44 so that the resultant engraving is a two dimensional engraving in the flat work piece 37 despite the spherically curved path traced by the scribe point.

A viewing device defined by hollow view tubes 50 permits an operator to check progress of the inscribing operation. A vibrator 51 may be attached to or contacted with sphere 40 and may be actuated automatically in response to movement of counterweights 31 to apply vibratory motion to sphere 40 and hence to scribes 44 in concert with the inscribing operation.

Figure 7:
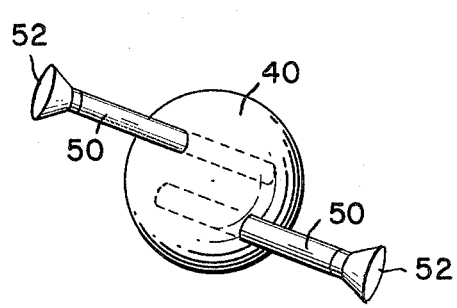
FIG. 7 is an isometric view of a portion of apparatus illustrated in FIGS. 1 and 2.

Progress of the engraving operation may be inspected by viewing through preferably magnifying eyepieces 52 at the ends of hollow view tubes 50; see particularly FIG. 7. Tubes 50 are received in ends of unnumbered cylindrical viewing passageways through sphere 40, which passageways terminate about scribes 44. Scribes 44 are sufficiently small that a viewer looking through an eyepiece 52 and an associated passageway can view around the base of scribe 44 and actually see the tip of the scribe contact the work piece as engraving proceeds.

The arrangement of scribing means 44 fixed to pivotal support 40 and movable therewith in response to stylus movement with the scribing means positioned above the stylus but below the center of rotation of the pivotal support produces the forward writing effect which is highly desirable.

Column 11, which supports upper portion 12, is split into two segments and is provided with an adjusting sleeve 60, permitting adjustment of the height of the center of rotation 41 of sphere 40 above template 15. Sleeve 25 allows adjustment of the length of sleeve member 17. In this manner, the effective amount of magnification of the inscribed image may be varied to great advantage.

Rate of spring 24 is chosen so that slight upwards movement of stylus 16 out of contact with template 15 does not disengage scribes 44 from work pieces 37 but major upward movement of stylus 16 out of contact with template 15 causes arms 30 to contact counterweights 31 thereby rotating cranks 100 about bearings 34 and disengaging work pieces 37 from scribes 44.

An advantage of the invention resides in the adjustable length of sleeve member 17. By adjusting the length of sleeve 17, an operator can select the size of letters in the engraved work piece among a range of letter sizes while using a single template 15.

Engraving scribes 44 are replaceably mounted in sphere 40 so that the scribes can be easily removed and replaced when their engraving points become worn. Threaded engagement is preferred.

Note that stylus 16 may be a follower or may be a writing instrument such as a ball point pen. Use of a ball point pen as stylus 16 allows an individual to sign the individual's name or other distinctive mark and thereby engrave a miniaturized version of the individual's name or mark on work piece 37.

Since the apparatus can engrave two work pieces 37 simultaneously with the same inscription, if an operator drops one of the work pieces and loses it, which can easily happen given the exceedingly small work pieces which the invention is often used to engrave, the remaining work piece can be utilized for the selected purpose.

Another advantageous use of a ball point pen as the stylus allows the operator to trace the template pattern on a piece of paper positioned between the template 15 and the support plate 14. By so tracing the pattern on the paper as the ball point pen follows the template channels, the operator knows where to begin again should he be interrupted during the engraving operation.

Figure 9:
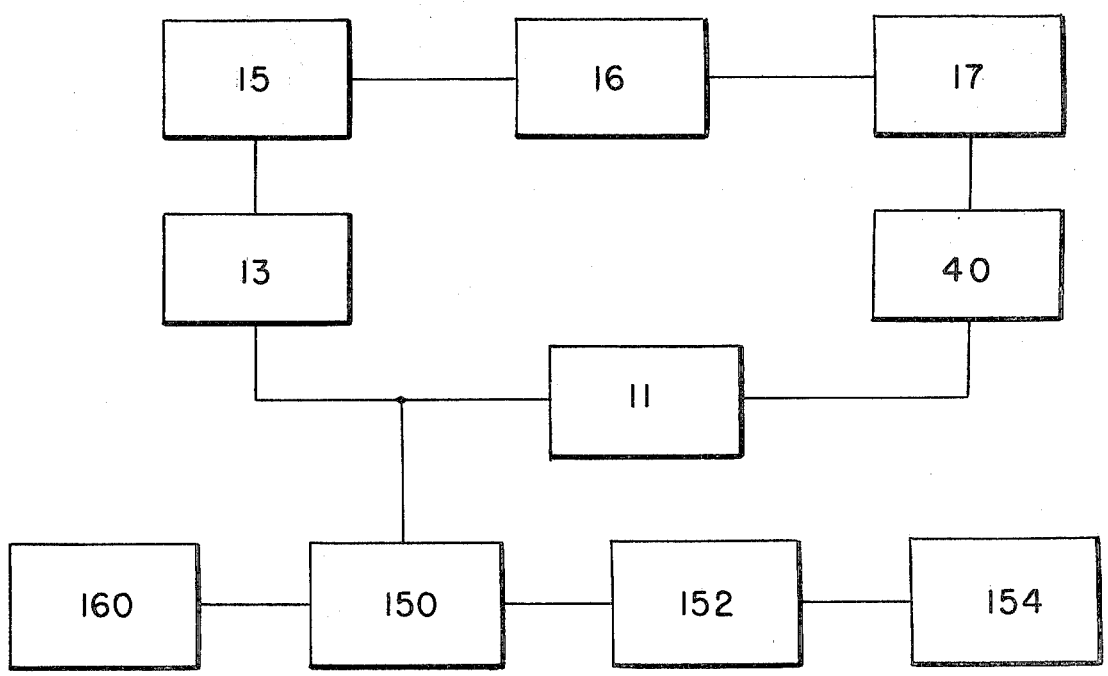
FIG. 9 is a schematic representation of circuit apparatus useful in practicing the invention.

An aspect of this invention resides in provision of separate sensing and activation circuits for the stylus and work piece-scribe combination. Specifically, a first electrical circuit may include stylus 16, sleeve member 17, spherically rotatable pivotable support 40, column 11 and horizontal base 13, with pivotable support 40 connected electrically to column 11 via either plate 35 or pad 42 or both. These elements are denoted schematically in FIG. 9. When an electrical voltage is applied to the circuit, conventional means, denoted 150 in FIG. 9, may be used to sense when the circuit has been completed by contact of stylus 16 with template 16 electrically connected to base 13. A second circuit may be provided to energize actuation means, respectively schematically denoted 152 and 154 in FIGS. 1 and 9, which places the work pieces 37 and scribe 44 in position for engraving in response to a signal produced by sensing means 150. Actuation means 154 could be a solenoid moving scribes 44 by projecting them outwardly from pivotal support 40 when the solenoid is actuated. Alternatively, actuation means 154 could be a solenoid moving crank 100 about bearing 34, with rotation of the crank moving work piece 37 into contact with the scribe 44.

Figure 8:
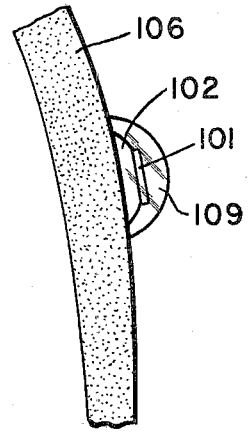
FIG. 8 is a broken side view showing an identification chip and carrying disk mounted on an exterior surface of a denture.

The first circuit could also be equipped with a signal light, denoted schematically 160 in FIG. 8, whereby when the stylus contacts base 13 or template 15 mounted thereon, a signal light indicates that engraving may proceed.

Another aspect of this invention is provision of an identification method and apparatus for conventional dentures used in a completely or partially edentulous mouth for masticating food where the dentures include artificial gum means adapted for close fitting with an alveolar portion of the denture owner's jaw and include artificial teeth protruding from the artificial gum means for food mastication. This aspect of this invention is particularly useful in identificiation of dentures belonging to elderly persons living in community residences such as in homes for the aged. Elderly person's memory powers sometimes fail. Dentures may sometimes be removed and left in and about residence premises. Positive identification is desirable to facilitate return of a lost denture or dentures to their owner.

Figure 3:
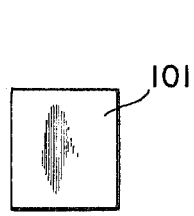
FIG. 3 is a schematic representation of an identification chip embodying an aspect of the invention.
Figure 4:
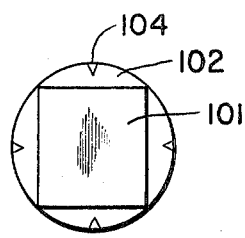
FIG. 4 is a schematic representation of an identification chip mounted on a carrier disk.
Figure 5:
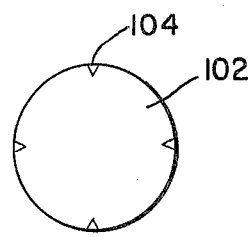
FIG. 5 is a schematic representation of a carrier disk for an identification chip prior to mounting the chip thereon.

Identification is preferably provided by an engraved chip 101, as illustrated in FIG. 3, on which suitable indicia identifying the denture owner have been engraved. The chip may be ceramic, carbide or other hard engravable material. The chip may be coated with a transparent coating, such as shellac, for extra protection. Engraving is preferably performed utilizing apparatus illustrated in FIGS. 1 and 2. The chip 101 is preferably cemented to and carried by a disk 102 as illustrated in FIG. 4; the individual disk is shown in FIG. 5. The disk is preferably dental acrylic material, preferably clear acrylic material. An individual chip may be from about 1.2 to about 3.5 millimeters on a side and hence may have area from about 1.1 to about 12.5 square millimeters. The chip may be about 0.1 millimeter thick. The chip may be cemented to the disk utilizing any suitable dental cement and/or dental plastic material. The chip-disk combination may then positioned in the engraving apparatus as the work piece. Keyed indentations 104 in the carrier disk facilitate rapid mounting, positioning and dismounting of the chip-disk combination on the engraving apparatus.

A cylindrical recess is bored in the denture to be identified. The recess is preferably made where denture plastic 106, in the form of an artificial gum, is thickest. One preferable area is the area of the second molar. The chip 101 carried by disk 102 is placed in the recess and resulting disk-chip combination is bonded to the artificial gum material at the bottom of the recess with dental cement. A cap 108 of preselected dimensions, made of clear acrylic plastic, is then positioned in the recess and cemented in place. The recess size is preselected to provide slidable receipt of the carrier disk and caps so that hand labor involved in installing the disk-chip-cap combination is minimized. The disk has a circular periphery of diameter selected for sliding contact with the cylindrical recessed ball. The cap is of a pre-formed cylindrical configuration diametrically sized for slidable insertion into the recess and longitudinally sized to occupy substantially the length of said recess from the chip to the gum surface. The completed combination is illustrated in FIG. 6.

Alternatively, the chip-disk combination can be cemented in place on the surface of a denture, and covered with a pre-formed bubble 109 of clear acrylic material which is in turn secured in place with suitable dental cements and/or plastics. Such a combination is illustrated in FIG. 8. So long as bubble 109 protrudes no more than one to two millimeters from the artificial gum surface 106 of the denture, the patient's mouth rapidly accepts the bubble and, in a day or two, the patient is unaware of presence of the bubble.

Figure 6:
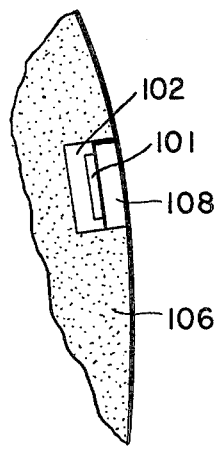
FIG. 6 is a broken sectional view showing an identification chip, with its carrying disk, mounted in an artificial gum portion of a denture.

In the embodiments illustrated in FIG. 6 and 8 the clear, high optical transparency characteristics of the cap 108 or bubble 109 allows visual inspection of the indicia engraved on the chip to determine the owner of the dentures. Due to the small size of the indicia, it may be required to view the indicia on the chip using a magnifying device.

As yet another alternative the chip may be fabricated of radiographically opaque material of a predetermined radiographic detectible shape. Ferrite is one acceptable material. This technique is well adapted to new dentures and provides relatively fool-proof means for identifying a decreased person, especially where the body has been mutilated or burned beyond recognition.

In all embodiments use of the carrier disk is optional and the chip is made of a material which is relatively inert.

I claim:

1. Apparatus for engraving a planar workpiece carried by a workpiece support, in which scribing means engraves a miniature representation in a frustro-spherical plane of a two-dimensional pattern in response to two-dimensional planar movement of a stylus following said pattern, the combination comprising:

(a) means forming a pivotal support above said stylus, said support being freely rotatable in response to stylus movement;

(b) means telescopingly connecting said stylus to said pivotal support so said support rotates in response to two-dimensional stylus movement about said pattern;

(c) said scribing means fixed to said pivotal support above said stylus but below the center of rotation of said pivotal support, extending downwardly from said support and rotatably movable unitarily therewith in response to two-dimensional stylus movement about said pattern;

(d) said means telescopingly connecting said stylus to said pivotal support including means for moving said workpiece, carried by said workpiece support, and said scribing means into and out of contact with one another independently of two-dimensional stylus movement over said pattern while said stylus maintains contact with said pattern, by rotating said workpiece support about a second pivot displaced from said center of rotation of said pivotal support.

2. Apparatus of claim 1 wherein said first support has a spherical surface, and wherein said scribing means is an elongated member fixedly protruding from said surface and having an engraving point at an end remote said spherical surface.

3. Apparatus of claim 1 wherein said scribing means comprises a plurality of scribes secured at spaced-apart locations to said support extending generally downwardly therefrom and movable unitarily therewith and wherein there are a plurality of workpiece supports, one for each of said scribing means, each workpiece support being rotatable about its own pivot separate from said support pivot, independently of stylus movement, said workpiece supports being adapted to position respective workpieces for engraving by respective scribing means below the center of rotation of said pivotal support.

4. Apparatus of claim 3 further comprising means for moving said work piece support away from said scribing means in response to stylus upward movement.

5. Apparatus of claim 1 further comprising means for vibrating said pivotal support to vibrate said scribing means as said scribing means contacts said work piece.

6. Apparatus of claim 1 wherein said stylus includes inking means at an end thereof remote said pivotal support.

7. Apparatus of claim 1 further comprising viewing means including a passageway passing through and fixedly connected to said pivotal support for rotary motion unitarily therewith, for visual inspection of said workpiece during engraving by a viewer looking through said passageway, with said pivot support intermediate the viewer's eye and said workpiece.

8. Apparatus of claim 1 further comprising:
(a) a crank having said workpiece support fixedly connected thereto;
(b) a counterweight fixed to said crank at a position remote said workpiece support;
(c) said crank being connected to said second pivot and rotatable thereabout at a position intermediate said workpiece support and said counterweight;
(d) said workpiece support urging said workpiece upwardly against said scribing means upon rotation of said crank about said second pivot due to gravitational force on said counterweight.

9. Engraving apparatus in which scribing means inscribes a work piece in response to movement of a stylus following a two dimensional pattern to be engraved wherein said scribing means engrave a miniature two dimensional reproduction of said pattern traced by said stylus, said scribing means moving unitarily in response to stylus movement so that left-to-right and front-to-rear movement of said stylus respectively produces left-to-right and front-to-rear movement of said scribing means, said two dimensions in which said scribing means moves defining a geometric plan skew to a geometric plane defined by said two dimensions in which said stylus moves, comprising:
(a) a stylus movable within a two dimensional pattern defined by a template;
(b) said template being supported by a base;
(c) a sleeve receiving said stylus and extending upwardly therefrom;
(d) a spring within said sleeve biasing said stylus downwardly;
(e) a column extending upwardly from said base, displaced laterally from said stylus and said sleeve;
(f) a plate extending laterally from said column;
(g) a spherically rotatable pivot member resident within an aperture in said plate and supported by said plate, said pivot member being freely rotatable about its center and receiving in a lower portion thereof an end of said sleeve opposite said end receiving said stylus;
(h) a bearing mounted on said plate;
(i) a lever having its central portion journaled in said bearing;
(j) a counter-weight attached to one arm of said lever;
(k) a work piece holder secured to a second arm of said lever, for holding said work piece to be inscribed; and
(l) scribing means extending from said pivot member below the center of rotation thereof, movable unitarily with said pivot member, a scribing point in the end of said scribing means remote said pivot member contacting a work piece held by said work piece holder as said lever pivots about said bearing due to downward force exerted by said counterweight.

10. Apparatus of claim 9 further comprising a pad connected to said column, resting on the top of said pivot member, having a spherically curved lower portion slidably complementally contacting said pivot member to retain pivot member between said pad and said aperture in said plate.

11. Apparatus of claim 10 further comprising a spring resident within said pad for applying downward bias to said pivot member.

12. Apparatus of claim 11 wherein said column includes a rotatable threaded member connecting coaxial portions of said column for adjusting height of said column.

13. Apparatus of claim 11 wherein said sleeve has two portions connected by a rotatable threaded member adjusting height of said sleeve.

14. Apparatus of claim 12 wherein said sleeve includes an axial slot and said apparatus further comprises an arm resident within and slidably movable along said slot, said arm when at an upper extremity of said slot contacting said counter-weight and rotating said lever about said bearing by urging said counterweight upwards, thereby moving said work piece away from said scribe.

15. Apparatus of claim 14 wherein said pivot member includes a passageway extending therethrough having one end proximate said scribing means and the remaining end located above the center of rotation of said pivot member, wherein said apparatus further comprises tubular optical viewing means connected to said pivot member and extending therefrom coaxially with said passageway at the end of said passageway remote said scribing means.

16. Apparatus of claim 15 further comprising a second spring within said sleeve at the end thereof received by said pivot member, biasing said sleeve downwardly from said pivot member.

17. Apparatus of claim 16 wherein said stylus comprises a ball-point pen.

18. Apparatus of claim 17 further comprising vibratory means on said plate, contacting said pivot member for vibrating said pivot member and said scribing means during engraving.

19. Apparatus of claim 18 wherein said pivot member is electrically insulated from said plate and said pad; wherein said stylus, said sleeve, said pivot member, said scribing means, said work piece holder, said lever, said bearing, said plate, said column and said base define an electrical circuit which is completed by contacting said stylus with a metallic template supported by said base; wherein said apparatus further comprises signal means for indicating whether said electrical circuit is completed.

20. Apparatus of claim 18 wherein said pivot member is electrically connected to said column, wherein said stylus, said sleeve, said pivot member, said column and said base define an electrical circuit and wherein said apparatus further comprises:

(a) signal means for sensing closure of said electrical circuit and producing an output signal indicative thereof; and (b) electro-mechanical means, responsive to said output signal, for urging said scribe means and said work piece together.

21. Apparatus for engraving a workpiece carried by a workpiece support, in which scribing means engraves a miniature representation of a pattern in response to movement of a stylus following said pattern, the combination comprising:

(a) means forming a spherically pivot support above said stylus, said support being freely rotatable in response to stylus movement;

(b) means connecting said stylus to said pivotal support so said support rotates in response to substantially two-dimensional stylus movement over said pattern;

(c) said scribing means extending fixedly downwardly from below the center of rotation of said pivotal support and movable unitarily therewith in response to stylus movement following said pattern;

(d) said means connecting said stylus to said pivotal support including means for moving said workpiece, carried by said workpiece support, and said scribing means into and out of contact with one another independently of stylus movement over said pattern while said stylus optionally maintains contact with said pattern by rotating said workpiece support about an axis displaced from center of rotation of said pivotal support.

22. Apparatus of claim 2 further comprising means for moving said workpiece support away from said scribing means in response to movement of said connecting means away from said pattern while said stylus remains in contact with said pattern.

23. Engraving apparatus in which scribing means engraves a generally planar work piece in response to movement of a stylus following a two dimensional pattern to be engraved wherein said scribing means moves in a path defining a curved surface to engrave a minature two dimensional reproduction of said pattern traced by said stylus, said scribing means moving unitarily in response to stylus movement so that left-to-right and front-to-rear movement of said stylus respectively produces left-to-right and front-to-rear movement of said scribing means, comprising:

a. a stylus movable within a two dimensional pattern defined by a template;

b. said template being supported by a base;

c. a sleeve receiving said stylus and extending upwardly therefrom;

d. a spring within said sleeve biasing said stylus downwardly;

e. a column extending upwardly from said base, displaced laterally from said stylus and said sleeve;

f. a plate extending laterally from said column;

g. a spherically rotatable pivot member within an aperture in said plate and supported by said plate, rotating freely about its center and receiving in a lower portion thereof an end of said sleeve opposite said end receiving said stylus;

h. a bearing mounted on said plate;

i. a lever journaled in said bearing;

j. a work piece holder secured to said lever, for holding said work piece to be inscribed;

k. scribing means extending from said pivot member below the center of rotation thereof movable unitarily with said pivot member, a scribing point in the end of said scribing means remote said pivot member being provided for contacting a work piece held by said work piece holder; and l. means for biasing said lever about a fulcrum defined by said bearing to urge said work piece against said scribing means as said stylus follows said pattern.

* * * * *